(12) United States Patent
Kusumoto

(10) Patent No.: US 6,966,848 B2
(45) Date of Patent: Nov. 22, 2005

(54) GOLF CLUB HEAD AND METHOD OF MANUFACTURING THE SAME

(75) Inventor: Harunobu Kusumoto, Tokorozawa (JP)

(73) Assignee: Daiwa Seiko, Inc., Higashikurume (JP)

( * ) Notice: Subject to any disclaimer, the term of this patent is extended or adjusted under 35 U.S.C. 154(b) by 117 days.

(21) Appl. No.: 09/994,893

(22) Filed: Nov. 28, 2001

(65) Prior Publication Data
US 2002/0065146 A1    May 30, 2002

(30) Foreign Application Priority Data

| Nov. 30, 2000 | (JP) | ............................ P2000-365908 |
| Dec. 6, 2000 | (JP) | ............................ P2000-371391 |
| Jul. 30, 2001 | (JP) | ............................ P2001-229753 |

(51) Int. Cl.[7] ............................................. A63B 53/04
(52) U.S. Cl. ...................... 473/342; 473/349; 473/350; 473/345
(58) Field of Search ................................ 473/324, 329, 473/332, 342, 345, 346, 349, 350, 347, 348

(56) References Cited

U.S. PATENT DOCUMENTS

| 4,438,931 | A | * | 3/1984 | Motomiya ................... 473/346 |
| 5,232,224 | A | * | 8/1993 | Zeider .......................... 473/345 |
| 5,800,285 | A | * | 9/1998 | Thorne et al. ............... 473/324 |
| 5,830,084 | A | * | 11/1998 | Kosmatka .................... 473/349 |
| 5,911,638 | A | * | 6/1999 | Parente et al. .............. 473/338 |
| 5,954,596 | A | * | 9/1999 | Noble et al. ................. 473/346 |
| 6,193,614 | B1 | * | 2/2001 | Sasamoto et al. ........... 473/329 |
| 6,398,666 | B1 | * | 6/2002 | Evans et al. ................. 473/345 |
| 6,428,426 | B1 | * | 8/2002 | Helmstetter et al. ........ 473/330 |
| 6,623,378 | B2 | * | 9/2003 | Beach et al. ................. 473/345 |

* cited by examiner

*Primary Examiner*—Sebastiano Passaniti
(74) *Attorney, Agent, or Firm*—McGinn IP Law Group, PLLC

(57) ABSTRACT

A golf club head of the invention includes a head body formed by a hollow member, and a face member for forming a face. The face in which a thick-walled portion and a thin-walled portion are formed by forging a metal plate subjected to rolling.

30 Claims, 10 Drawing Sheets

GOLF CLUB HEAD AND METHOD OF MANUFACTURING THE SAME

BACKGROUND OF THE INVENTION

The present invention relates to a golf club head in which a fringe portion of a face member is fixed to a head body by welding.

As compared with conventional golf club heads, with recent golf club heads, the volume of the head has become large for the ease of striking the ball and to improve stability and increase the flying distance. Since such a golf club head is so configured as to increase the volume of the head while avoiding the tendency of the club head becoming heavy, the respective portions of the head in terms of thickness are formed to be thin, and metallic materials having fixed thicknesses are in many cases used for the respective portions of the head. For example, in the case of a face, a face member is used which is processed into a plate member with a uniform thickness made of a metal such as a titanium alloy. According to the face member constituted by such a plate member with a uniform thickness, it is possible to thin the overall face member in terms of its thickness without unevenness in the overall thickness and strength, so that it is possible to obtain a stable-quality face excelling in repulsion.

In contrast to the conventional golf club head in which the thickness of the overall face member is fixed, a golf club head has been recently introduced in which a thick-walled portion and a thin-walled portion are provided in the face member, and the thickness of the face member is varied for the respective portions so as to optimally distribute the rigidity (JP-A-9-239075).

According to the golf club head in which a central portion of the face member is made thick and its peripheral portion is made thin, it is possible to obtain a ball striking surface in which the central portion has high rigidity, is difficult to flex at the moment of impacting, and can strike the ball stably. Meanwhile, the peripheral portion is low in rigidity, flexes and rebounds, thereby making it possible to increase the flying distance of the ball.

However, since the face members of the conventional type in which the thickness is varied for the respective portions are fabricated by forging, variations of the thickness of the face members and their waviness are large, so that it is difficult to fabricate the respective portions with planned dimensions and strengths. In particular, since the peripheral portion is formed with a small thickness, apprehension concerning the strength remains.

JP-A-11-76474 proposes a golf club head in which a face member obtained by subjecting a metal member such as a titanium alloy to rolling is used to enhance the strength and ball rebounding performance.

However, since the metallic face member subjected to rolling is a metal plate member having a uniform thickness in its entirety, and the variations of the strength of the respective portions are small, if the face member is made thin, the central portion of the face is easily flexed at the instant of impacting, and sufficient rebounding can be obtained by the overall face, but the strength of the central portion of the face for directly hitting the ball cannot be sufficiently obtained. At the same time, it is difficult to form a stable striking surface. In addition, the striking feel at the time of impacting is not clear.

Meanwhile, JP-A-9-239075 proposes a golf club head in which a metallic face member is formed by forging, and a central portion is made thick, and its peripheral portion is made thin. With the face member in which a thick-walled portion and a thin-walled portion are formed by this forging has an advantage in that it is possible to obtain a striking surface in which the central portion of the face has sufficient strength.

However, since the face member is formed in such a form that there are variations in the thickness since the central portion is made thick and the peripheral portion of the face is made thin by forging, there are large variations in quality. For example, it is impossible to obtain a planned configuration, and variations in the strength are large. In particular, variations in the strength are likely to occur in the thin-walled portion. Accordingly, there has been a tendency that breakage is likely to start from the thin-walled portion where the variations in the strength are large.

In a metallic golf club head, the directionality of a struck ball is improved by increasing the moment of inertia, and that the flying distance is improved with a high rebound of the ball by making the face thin-walled. Golf clubs have been actually marketed to which are fitted golf club heads in which, concerning such faces, the strength is partially enhanced, the rebounding is partially enhanced, and a thick-walled portion and a thin-walled portion are partially provided to make uniform the stress of the face with respect to the impact. Such golf club heads have been introduced in JP-A-9-168613, JP-A-10-137372, JP-A-9-192273, and the like.

A metal face whose thickness is varied in the conventional golf club head is fabricated by casting or forging from a metal mass (round bar). In this case, if the metal face whose thickness is varied is fabricated by casting, the metallographic structure becomes coarse, and voids are likely to be produced, so that variations are likely to occur in the strength. In addition, if such a metal face is fabricated by forging from a metal mass, since large plastic deformation takes place, the metallographic structure becomes dense, but its density is not stable, and variations occur in the density of the structure. Moreover, since the metal face is normally manufactured by hot forging, the characteristics of the material undergo a change, so that the durable strength declines.

Thus the conventional metallic face which has been fabricated by casting or forging and whose thickness is varied has a problem in that there are variations in the strength, and breakage or the like is likely to occur.

SUMMARY OF THE INVENTION

The invention has been devised to overcome the above-described problems, and its object is to provide a golf club head which makes it possible to make the face member thin by the use of a material having small variations in the strength, and which makes it possible to ensure sufficient strength with respect to the shock at the time of impacting, enhance the repellency at the time of impacting, increase the flying distance of the ball, and make clear the striking feel at the time of impacting.

Further, the object of the invention is to provide a golf club head having a metal face with its thickness varied and with sufficient strength, as well as a method of manufacturing a golf club head having such a metal face.

Further, the object of the invention is to provide a golf club head which facilitates the adjustment and processing of the thickness of the face member, facilitates the fabrication of respective portions to planned dimensions and strengths, and makes it possible to enhance the strength for attaching the face member to a head body.

In order to solve the aforesaid object, the invention is characterized by having the following arrangement.

(1) A golf club head comprising:
a face portion formed by using a plate-like metal member subjected to rolling, the face portion having a thick-walled portion and a thin-walled portion.

(2) The golf club head according to (1), wherein the thick-walled portion is smoothly connected to the thin-walled portion.

(3) The golf club head according to (1), wherein a change from the thick-walled portion to the thin-walled portion is gentler in a direction perpendicular to a rolling direction than in the rolling direction.

(4) The golf club head according to (1), wherein the thick-walled portion and the thin-walled portion are formed by a change of a reverse surface of the face portion, and there is a difference in thickness of 10% or more between the thick-walled portion and the thin-walled portion.

(5) The golf club head according to (1), wherein the face portion is formed by using the plate-like metal member subjected to rolling and whose central portion is thick-walled and whose peripheral portion is thin-walled.

(6) The golf club head according to (1), wherein the metal member is subjected to rolling in a state in which a rolling direction of the metal member for making up the face member is set to a short-dimension direction of the face member.

(7) The golf club head according to (5), wherein the plate-like metal member subjected to rolling is subjected to machining to make the central portion thick-walled and make the peripheral portion thin-walled.

(8) The golf club head according to (5), wherein the thin-walled portion is formed such that closer to a peripheral side of the metal member, the thinner.

(9) The golf club head according to (1), wherein the thick-walled portion and the thin-walled portion are formed in the face by forging the metal plate subjected to rolling.

(10) The golf club head according to (5), wherein the face is subjected to rolling in a top-sole direction, and the central portion thereof is formed to be thick-walled.

(11) The golf club head according to (1), wherein the thin-walled portion has a direction of its crystal grains oriented in a same direction as that of the thick-walled portion.

(12) The golf club head according to (5), wherein the thin-walled portion has a direction of its crystal grains oriented in a direction toward a periphery of the face.

(13) A method of manufacturing a golf club head having a metallic face in which a thick-walled portion and a thin-walled portion are formed, comprising the step of: forging a metal plate subjected to rolling so as to form the thick-walled portion and the thin-walled portion on the face.

(14) The method of manufacturing a golf club head according to (13), wherein after the metal plate for making up the face is subjected to rolling in a top-sole direction, the face is pressed by forging in a greater amount on a peripheral portion of the face than on a central portion thereof.

(15) The method of manufacturing a golf club head according to (13), wherein the forging is cold forging.

(16) A golf club head comprising:
a head body; and
a face member,
wherein at least a peripheral portion of a reverse surface of the face member, which is located around a central portion of the reverse surface of the face member, is shaved down so that the central portion of the face member becomes thick, and a peripheral edge portion of the face member in which the peripheral portion around the central portion has been thinned is welded to a head body.

(17) The golf club head according to (16), wherein a maximum height of the surface roughness of the peripheral portion of the reverse surface of the face member is 30 µm or less.

(18) The golf club head according to (16), wherein a fringe surface for welding is formed at the peripheral edge portion of the reverse surface of the face member by machining.

(19) The golf club head according to (18), wherein a maximum height of the surface roughness of the fringe surface for welding is 30 µm or less.

According to the invention, the wall thickness of the face can be suitably adjusted by providing the thick-walled portion and the thin-walled portion. Therefore, the suitable strength of the face can be applied in accordance with the stress of the face of the golf club head against the ball impact, and wave saving can be achieved by removing the useless wall thickness. Since the plate-like metal member subjected to rolling is employed as the face, the quality of the metal member is stable, and damage is hardly occurs even if the thick-walled portion and the thin-walled portion are provided to the face, and the sufficient rebounding can be obtained.

According to the invention, since the stress does not concentrate on one part even if the thick-walled portion and the thin-walled portion are provided to the face, the face is hardly damaged.

According to the invention, since the change from the thick-walled portion to the thin-walled portion is gentle in the direction perpendicular to the rolling direction, occurrence of the crack formed in a border between the thick-walled portion and the thin-walled portion can be prevented.

According to the invention, the suitable strength can be applied to the face in accordance with the stress of the face of the golf club head against the ball impact, while maintaining directional property.

DETAILED DESCRIPTION OF PREFERRED EMBODIMENTS

First Embodiment

FIGS. 1 to 4 show a golf club head of a wood type which is a metallic hollow head in accordance with a first embodiment of the invention.

Figure 2:
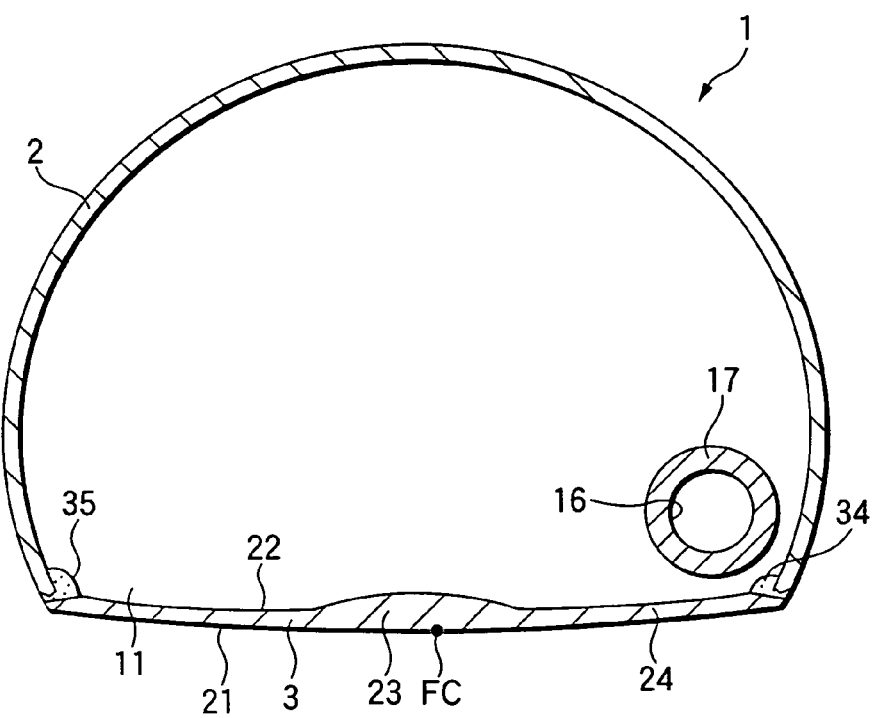
FIG. 2 is a cross-sectional view taken along a center of the golf club head in accordance with the first embodiment.

This golf club head 1 has a head body 2 formed by a hollow member, and a face member 3 for forming a face. As shown in FIG. 2, an opening 11 is formed in the head body 2 on the face side. With the golf club head 1, a lower surface portion of the head body 2 is formed as a sole 12, an upper surface portion thereof is formed as a top 13, and left- and right-hand portions of the face member 3 are respectively formed as a toe 14 and a heel 15. A shaft securing portion 17 having a shaft securing hole 16 for attaching an unillustrated club shaft is formed on the heel 15 side.

Figure 1:
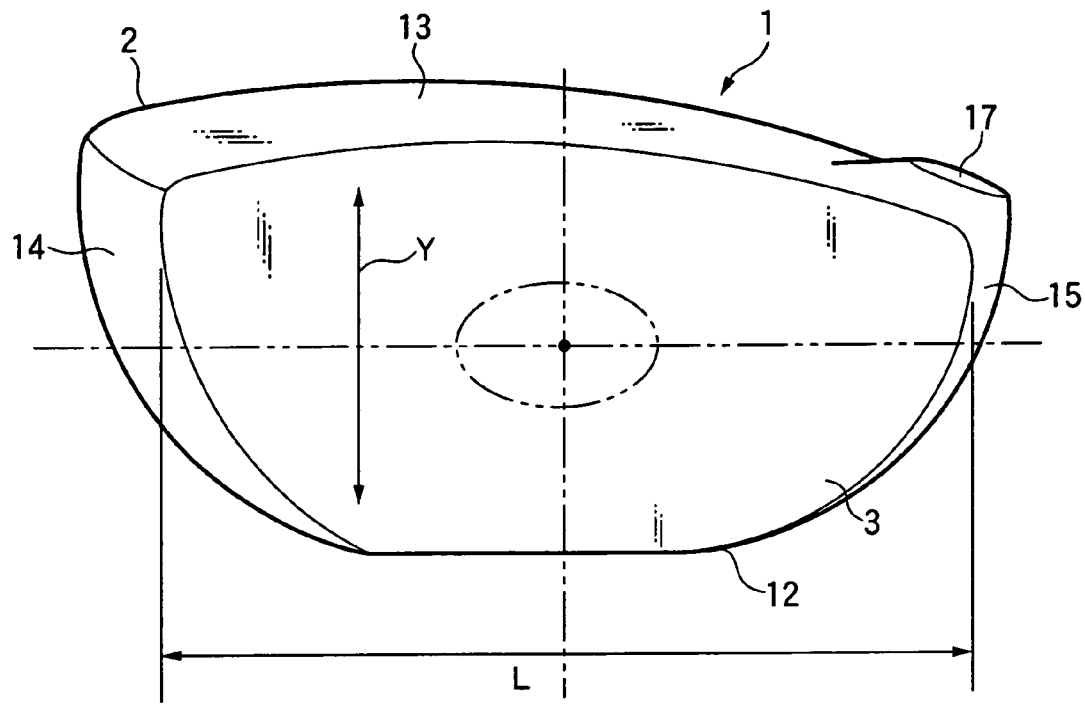
FIG. 1 is a front elevational view of a golf club head in accordance with a first embodiment.

The face member 3 is disposed at the opening 11 of the aforementioned head body 2. The shape of the face member 3 is that of a contour conforming to the shape of the opening 11 of the head body 2, as shown in FIG. 2. The face member 3 is fixed to the head body 2 by causing the entire peripheral edge of the face member 3 to abut against the peripheral edge of the opening 11 of the head body 2 and by welding them together. The contour of the opening 11 of the head body 2 is, in other words, the contour of the face member 3. In the same way as a general golf club head, the length of this contour differs in the substantially perpendicular direction, and the length is long in the toe-heel direction and is short in the top-sole direction, as shown in FIG. 1. The length L in the toe-heel direction is longer than the length in the top-sole direction (the horizontal length passing through a face center FC is normally maximum).

The face member 3 is fabricated into a predetermined shape by stamping out a rolled metal plate by a press and machining its reverse surface. An outer surface 21 of the face member 3 is a flat surface, while a reverse surface 22 of the face member 3 is formed into a projecting shape. It should be noted, however, that the outer surface 21 is not a completely flat surface and is a surface which is curved in such a manner as to protrude gently.

As for the protruding shape of the reverse surface 22 of the face member 3, a central area about the face center FC is formed to be high in the shape of a ridge, and the portion of this central area is formed as a thick-walled portion 23. That is, an area which is formed around this thick-walled portion 23 is formed to be low in the shape of the base of the ridge, and this area is formed as a thin-walled portion 24. Namely, the central area about the face center FC is formed as the thick-walled portion 23, and the peripheral portion around the thick-walled portion 23 is formed to be low in the shape of a gentle base of the ridge, and is formed as the thin-walled portion 24. A top portion 33 of the thick-walled portion 23 is formed flatly. The maximum thickness of the thick-walled portion 23 is 3 mm or less, and the maximum thickness of the thin-walled portion 24 is naturally smaller than that thickness.

The face center FC refers to a point on the face which is intermediate between a top edge and a leading edge on the face center line in the top-sole direction passing through an intermediate position of the face width.

The aforementioned face member 3 is one in which crystal grains of its structure are close packed by subjecting it to rolling, and the crystal grains are oriented to be elongated in one direction, the longitudinal direction of the crystal grains being oriented in the short-dimension direction of the face member 3, i.e., in the so-called top-sole direction Y. In addition, the face member 3 is subjected to rolling, and it is possible to employ, as materials suitable as the face member 3, titanium, a titanium alloy, stainless steel, aluminum, soft iron, marageing steel, and the like.

Figure 3:
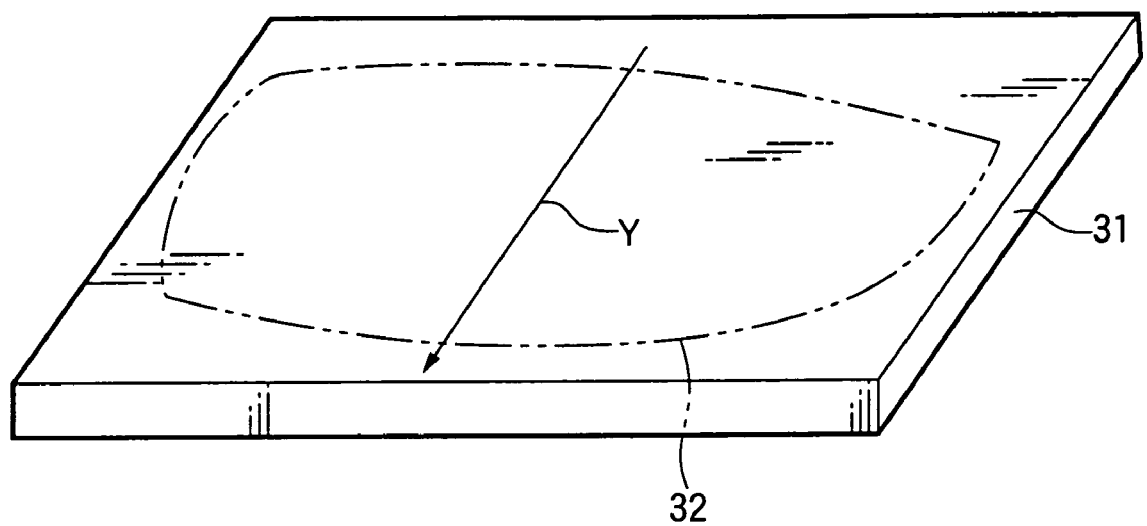
FIG. 3 is a diagram explaining the procedure for processing a face member of the golf club head in accordance with the first embodiment.

Next, referring to FIGS. 3 and 4, a description will be given of the method of processing the face member 3. First, as shown in FIG. 3, the face member 3 is stamped out by a press from a metal plate 31 subjected to rolling in advance. At this time, an area which is to be used as the face member 3 is stamped out along the two-dotted dash line shown in FIG. 3 such that the rolling direction Y of the metal plate 31 becomes the vertical direction of the face member 3. The portion which is to be used as the face member 3 may be cut out from the metal plate 31 by another processing method.

In the face member 3 thus cut out from the metal plate 31 subjected to rolling, the longitudinal direction Y of the crystal grains elongated by rolling is oriented in the top-sole direction which is the short-dimension direction of the face member 3. Incidentally, the longitudinal direction of the crystal grains may be at an angle of being tilted back and forth or left and right within a fixed margin which can be considered to be a substantially vertical direction substantially perpendicular to the surface of the sole 12. For example, the longitudinal direction of the crystal grains may be an angular direction which is tilted back and forth or left and right within an angular range of 30°.

Figure 4:
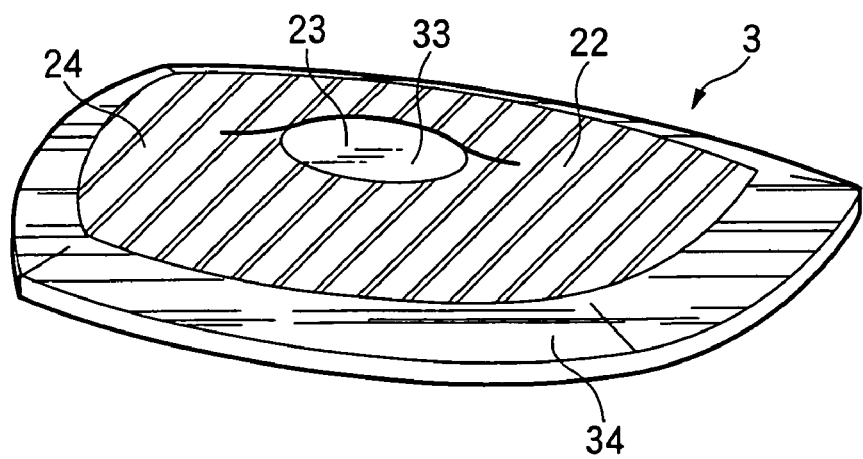
FIG. 4 is a diagram explaining the procedure for machining the face member of the golf club head in accordance with the first embodiment.

Next, as shown in FIG. 4, as for the reverse surface 22 of the face member 3 thus stamped out from the metal plate 31, the central area about the face center FC is left as the thick-walled portion 23, this portion is set as the flat top portion 33, and a peripheral portion around the flat top portion 33 is shaved down by, for example, machining to form the thin-walled portion 24. In the case where the peripheral area around the top portion 33 is shaved down, shaving is effected such that the closer to the periphery, the thinner. Accordingly, as shown in FIG. 2, the portion corresponding to the thin-walled portion 24 of the reverse surface 22 assumes a gentle shape continuing from the edge of the thick-walled portion 23 in the central area, and an extreme step is not produced.

In the case where machining is effected for shaving down the reverse surface 22 of the face member 3, shaving may be performed in two stages of rough cutting and finishing. If the work is finished by rubbing, even if the marks of a tool remain, the marks can be very small, so that it is possible to prevent the tool marks causing breakage. In a case where rough cutting and finishing are performed with cutters, particularly in a case where finishing is performed, cutting is preferably effected by conforming the moving direction of the cutter to the top-sole direction (direction conforming with the rolling direction) of the face member 3. Therefore, even if the marks of the cutter remain microscopically, the possibility of breakage from the marks is small as compared with the case of the cutter marks in the toe-heel direction which remain when cutting is effected by moving the cutter in the toe-heel direction.

As shown in FIG. 4, in the reverse surface 22 of the face member 3, a peripheral portion located outwardly of the thin-walled portion 24 is provided with trimming by being further shaved down, thereby forming a tilted fringe portion 34.

The fringe portion 34 of the face member 3 is made to abut against the peripheral edge of the opening 11 of the head body 2, and the two members are welded together. Due to the face that the fringe portion 34 is provided, the spreading around of a welding material 35 is made favorable, so that the face member 3 can be reliably welded to the head body 2.

Second Embodiment

Figure 5:
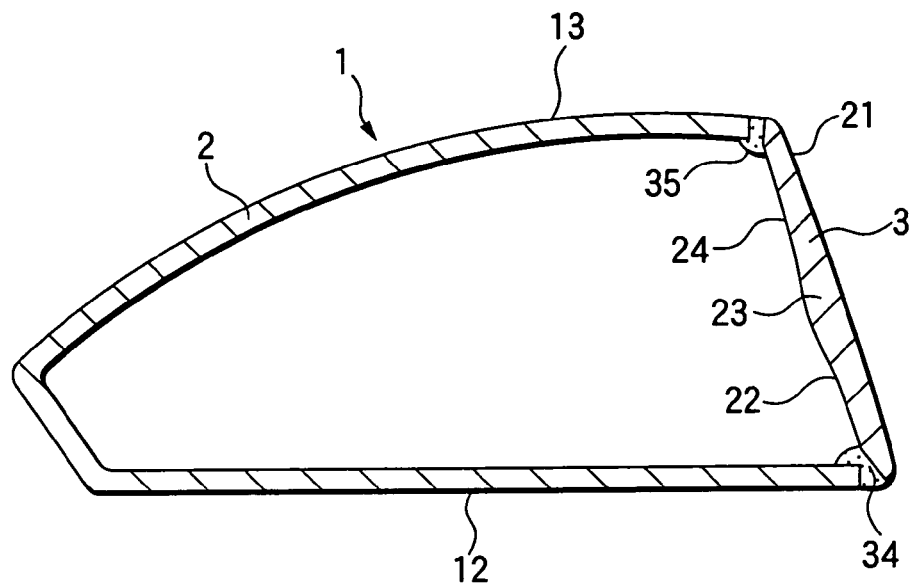
FIG. 5 is a vertical cross-sectional view taken along the center of the golf club head in accordance with another embodiment.

FIG. 5 shows a golf club head in accordance with a second embodiment of the invention. In the golf club head 1 in accordance with this embodiment, when the reverse surface 22 of the face member 3 is shaved down by shaving, the portion of the thick-walled portion 23 in the central area is processed into the shape of a top portion which is not flat but rounded. According to this embodiment, since the thick-walled portion 23 and the thin-walled portion 24 continue smoothly at their boundary, the stress does not concentrate in the boundary, and the overall strength of the face member 3 increases.

Third Embodiment

Figure 6:
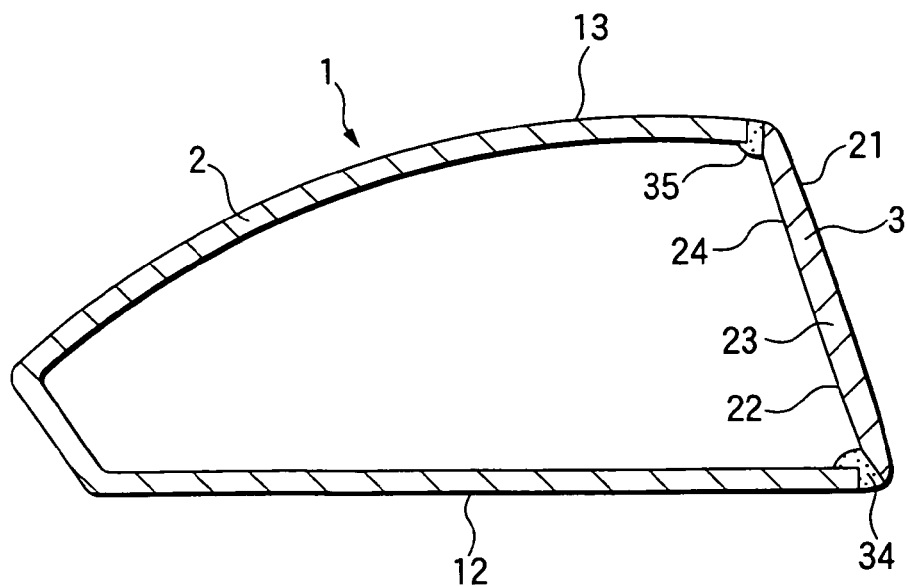
FIG. 6 is a vertical cross-sectional view taken along the center of the golf club head in accordance with still another embodiment.

FIG. 6 shows a golf club head in accordance with a third embodiment of the invention. In the golf club head 1 in accordance with this embodiment, when the reverse surface 22 of the face member 3 is shaved down by shaving, machining is effected over the area covering the thick-walled portion 23 in the vicinity of the face center FC and the thin-walled portion 24 surrounding it, such that the flat top portion is not left, and the overall reverse surface 22 is cut into a rounded gentle shape. In this embodiment as well, since the thick-walled portion 23 and the thin-walled portion 24 continue smoothly at their boundary, the stress does not concentrate in the boundary, and the overall strength of the face member 3 increases.

Further, although not shown, the overall reverse surface 22 may be processed into a conical shape in which it is pointed in the vicinity of the center of the thick-walled portion 23.

It should be noted that, as the processing method for forming the thin-walled portion in the plate-like metallic member subjected to rolling, it is possible to adopt not only cutting but also grinding, rubbing, and the like insofar as they are capable of removing the thickness without changing the state of the crystal grains of the structure of the face member 3. In other words, extensive machining method can be applied.

Furthermore, after the metal plate 31 is formed into a predetermined thickness by subjecting it to machining, the face member 3 may be cut out.

With the golf club head in this embodiment, since the metal plate subjected to rolling is used for the face member 3, it is possible to obtain the face member 3 which, for instance, as compared with a forged face member, has no variations in strength, is difficult to break, and is stable in quality. Even if the thickness of the face member 3 is varied, it is possible to reliably obtain a product in which the face member 3 subjected to rolling has planned rigidity and strength. In addition, since the thick-walled portion 23 is formed at the central portion of the face, the central portion of the face has sufficient strength against a shock at the time of impacting the ball, and the stability of striking the ball is high. Since the peripheral portion of the face member 3 is formed as the thin-walled portion, the thin-walled portion sufficiently rebounds at the time of impacting the ball, so that it is possible to improve the carry of the ball, and the peripheral portion of the face member 3 is difficult to break.

Since the face member 3 is provided with processing in which it is rolled in the vertical direction, the longitudinal direction of the crystal grains of the material is oriented in the short-dimension direction of the face member 3, so that the breaking elongation (strength) in the vertical direction of the face member 3 becomes large, and it is possible to prevent fractures along the horizontal direction which are liable to occur in the face member 3.

It is possible to employ, as the face member 3, a material subjected to rolling in the vertical direction and the horizontal direction. In this case, if the longitudinal direction is absent in the crystal grains of the material, the face member 3 can be secured to the head body 2 irrespective of the rolling direction.

Since the thin-walled portion 24 of the face member 3 is formed by machining, unlike the case where it is formed into a predetermined configuration by forging, it is possible to obtain planned quality, so that the quality becomes stable, and face characteristics of planned strength can be obtained in the thin-walled portion 24 of the face member 3 as well.

Fourth Embodiment

Figure 7:
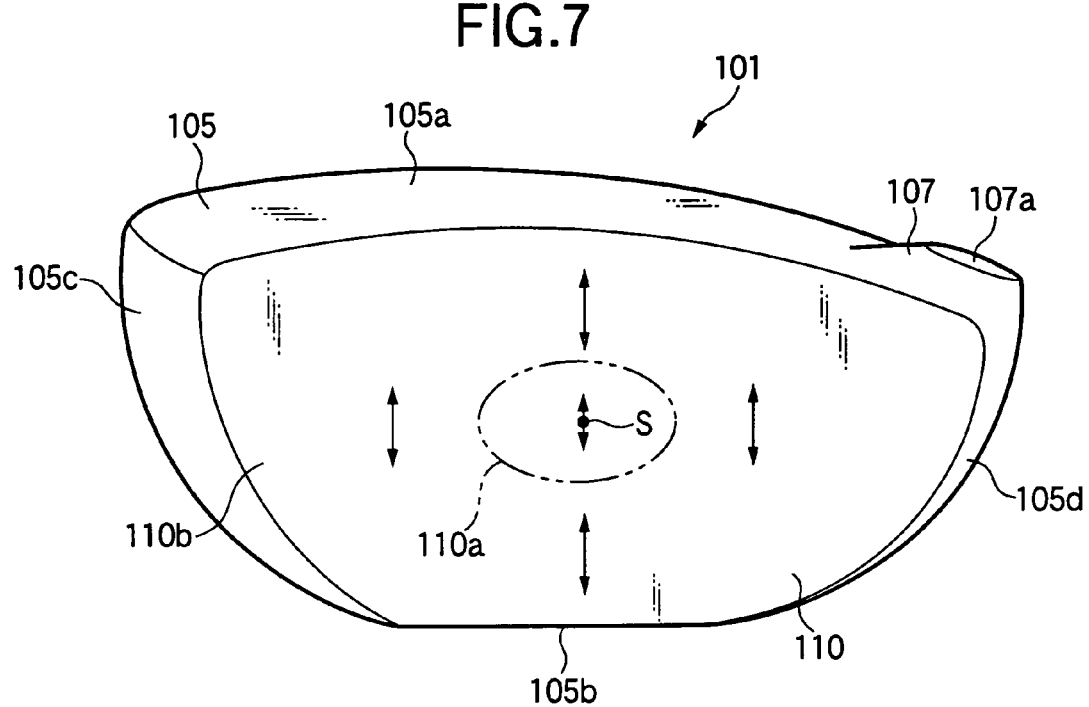
FIG. 7 is a front elevational view illustrating a first embodiment of a golf club head in accordance with the invention.
Figure 8:
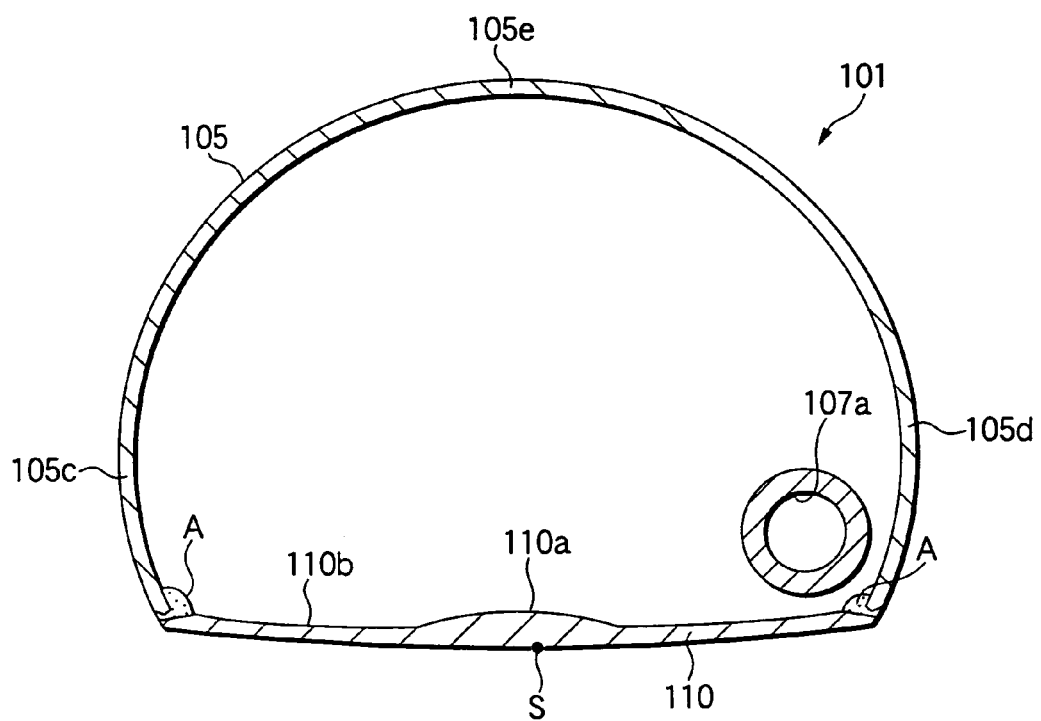
FIG. 8 is a plan cross-sectional view of the golf club head shown in FIG. 7.
Figure 9:
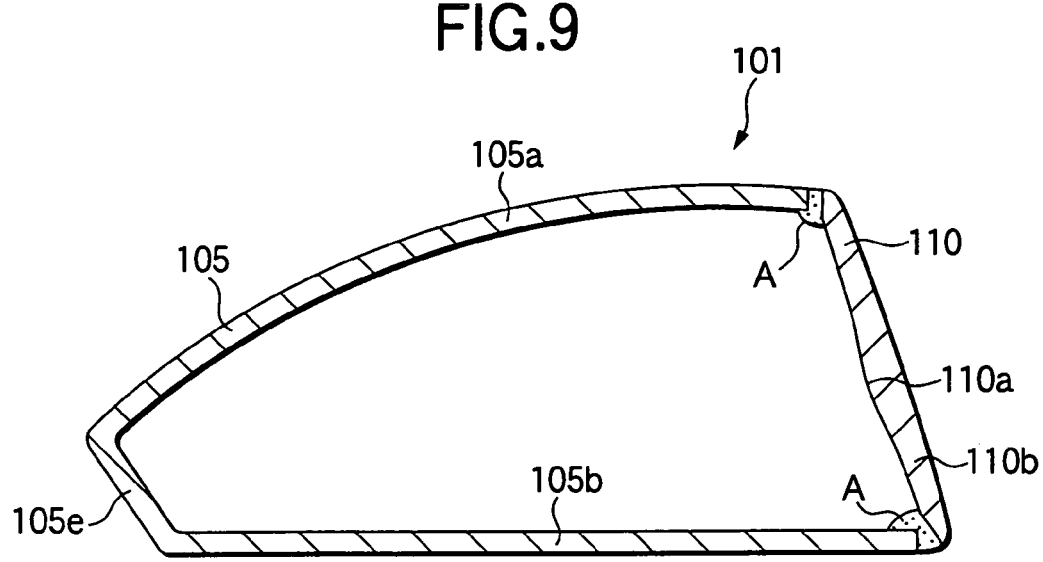
FIG. 9 is a side cross-sectional view of the golf club head shown in FIG. 7.

FIGS. 7 to 9 are drawings illustrating a fourth embodiment of a golf club head in accordance with the invention, in which FIG. 7 is a front elevational view, FIG. 8 is a plan cross-sectional view, and FIG. 9 is a side cross-sectional view.

A golf club head (hereafter referred to as the head) 101 in accordance with this embodiment is formed into a hollow state by securing a face 110 to an opening of a head body 105 by means of such as welding (the weld portion is indicated by reference character A). In this embodiment, the head body 105 is formed of a titanium alloy (Ti—6Al—4V), and the face 110 which is formed as will be described later is secured at the opening.

The head body 105 comprises outer shell members including a top 105a, a sole 105b, a toe 105c, a heel 105d, and a back 105e, and these members are formed integrally by casting (may be formed by forging or pressing). In this case, the respective outer shell members may be individually formed, or by arbitrary members (e.g., the toe, the heel, and the back) may be formed integrally. As these separate outer shell members are integrated by welding or the like, the head body 105 is formed.

A hosel 107 is formed in the top 105a, and an unillustrated shaft is inserted and is secured in the shaft hole 107a.

In this embodiment, in the face 110, a peripheral area (area surrounded by the dotted line in FIG. 7) around a sweet spot S in the center is formed to be thick-walled (thick-walled portion 110a), while an area leading from its surrounding portion to an edge is formed to be thin-walled (thin-walled portion 110b). In this case, the face 10 is formed by causing a rolled plate of a β-based alloy (e.g., Ti—15Mo—5Zr—3Al and Ti—15Mo—5Zr—4V—4Al) to be plastically deformed into the aforementioned shape by forging in accordance with a manufacturing method which will be described later.

It should be noted that although the positions where the thick-walled portion and the thin-walled portion are formed are arbitrary, if, as described above, the thickness of the face 110 its central side where the ball striking is concentrated is made thick, the construction becomes such that the face is difficult to break against the shock at the time of striking the ball, and if its peripheral side is made thin, the construction becomes such that the ball striking feel becomes soft, and the carry improves due to excellent rebounding.

Incidentally, as for the rolled plate formed by subjecting the aforementioned material to rolling, the crystal grains of the material are close packed and are, as a whole, set in a state of being oriented in the rolled direction. The direction of arrows in FIG. 1 shows such a rolled direction (the direction of orientation in which the crystal grains of the metallographic structure have become elongated). Namely, if the face is set in the state of being rolled in the top-sole direction, the elongated direction of the crystal grains is oriented in the top-sole direction.

On the other hand, if the face is flexed due to the shock at the time of striking the ball, since the width in the toe-heel direction of the face is formed to be larger than the width in the top-sole direction, the curvature of flexure is more difficult to take place in the top-sole direction than in the toe-heel direction. Accordingly, with an ordinary face, cracks and breakage are likely to occur along the toe-heel direction in the vicinity of the sweet spot where the ball striking is concentrated. However, if the longitudinal direction of the crystal grains is oriented in the top-sole direction as described above, the strength in the top-sole direction becomes large, an it is possible to prevent cracks with respect to hard curvature of flexure. Even if the thick-walled portion and the thin-walled portion are formed at the positions such as those described above, since the metallographic structure has been made dense and set in a state in which unevenness is small due to rolling, it becomes possible to obtain sufficient strength in addition to the above-described operational advantage.

It should be noted that, concerning the thick-walled portion and the thin-walled portion of the face, if there is a sharp change in the thickness between them, the stress is liable to be concentrated. For this reason, as shown in FIGS. 8 and 9, it is preferable to form the thick-walled portion 110a and the thin-walled portion 110b into a shape in which they continue gently.

According to the above-described structure of the face, since the strength can be further improved over a general face formed by forging, it becomes possible to form the thickness of the thick-walled portion 110a in the range of from 2.0 to 3.0 mm, and the thickness of the thin-walled portion 10b in the range of 1.3 to 2.5 mm. In particular, in a case where the face is formed of the β-based titanium alloy as in this embodiment, it becomes possible to form the thickness of the thick-walled portion 10a in the range of from 2.0 to 2.7 mm or thereabouts, and the thickness of the thin-walled portion 110b in the range of 1.3 to 2 mm or thereabouts. Incidentally, as for score line grooves formed on the striking surface side and ribs on the inner side of the face (e.g., with a height of 0.3 mm or less), such portions do not form the thickness of the thin-walled portion and the thick-walled portion.

In practice, as for the rolled plate prior to forging, which is used as the face material, by using a plate with a thickness of 4.5 mm or less, preferably 3.0 mm or less (1.0 mm or more), it becomes possible to make the plastic deformation at the time of forging small since the thickness of a general face is 3.0 mm or less.

Fifth Embodiment

Figure 10:
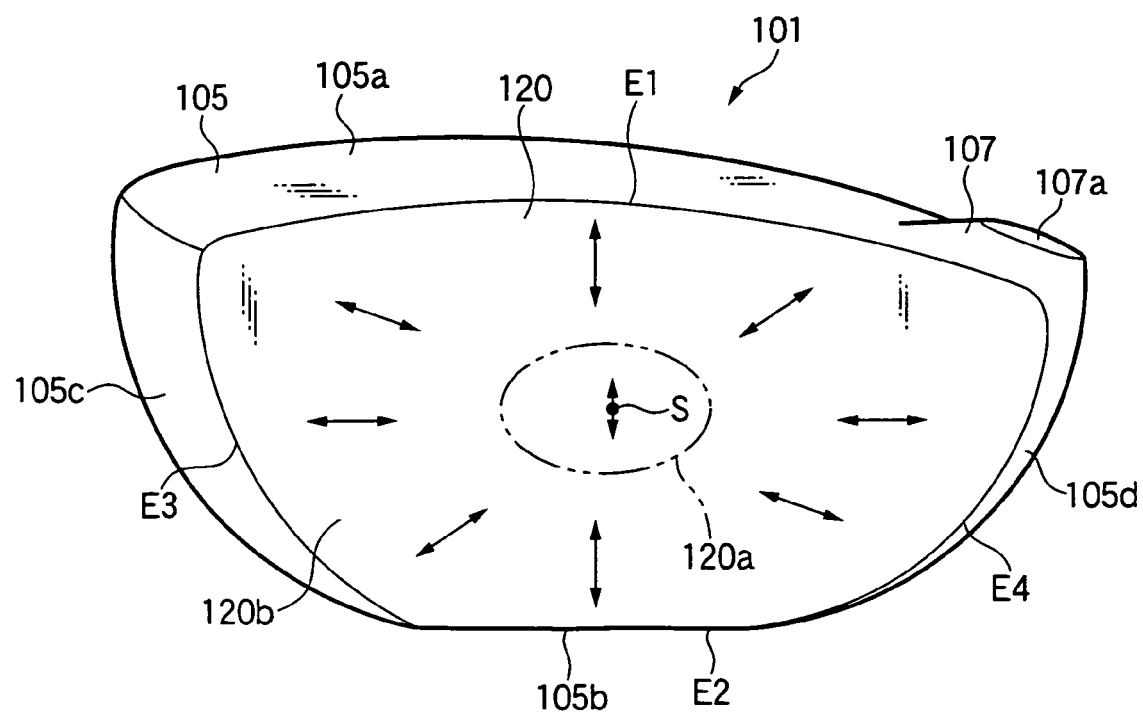
FIG. 10 is a front elevational view illustrating a second embodiment of the golf club head in accordance with the invention.

FIG. 10 is a front elevational view illustrating a fifth embodiment of the golf club head in accordance with the invention.

In the head of this embodiment, the rolled direction of its face 120 is set in the top-sole direction, a thick-walled portion 120a on the central side of the face is plastically deformed in such a way as to expand outwardly when the thick-walled portion 120a is thinned by forging. For this reason, since the central side which does not undergo a large plastic deformation remains as it is as the thick-walled portion, the elongated direction of the crystal grains is the same top-sole direction as at the time of rolling. On its peripheral side the longitudinal direction of the crystal grains is changed to the direction toward the periphery (radial direction) when the thin-walled portion is formed.

According to such a structure of the face, since the longitudinal direction of the crystal grains becomes oriented in directions perpendicular to the directions of the edges around the face, it becomes possible to effectively prevent cracks along the edges (top edge E1, leading edge E2, toe-side edge E3, and heel-side edge E4).

It should be noted that, although not shown, it is conceivable that the direction of the crystal grains becomes random depending on the manner of forging at the periphery of the face, but the invention also includes such an arrangement. In this case, as for at least the central side of the thick-walled portion where not much pressing force of forging is applied, the longitudinal direction of the crystal grains should preferably be oriented in a fixed direction (top-sole direction) as at the time of rolling.

Next, referring to FIGS. 11 to 15, a description will be given of the process of producing the face portion which is secured to the head body when the above-described golf club head according to the fourth and fifth embodiments is manufactured. It should be noted that the head body is fabricated-by subjecting the respective outer-shell members to welding or the like, and the face which is secured to this head body is produced as follows.

Figure 11:
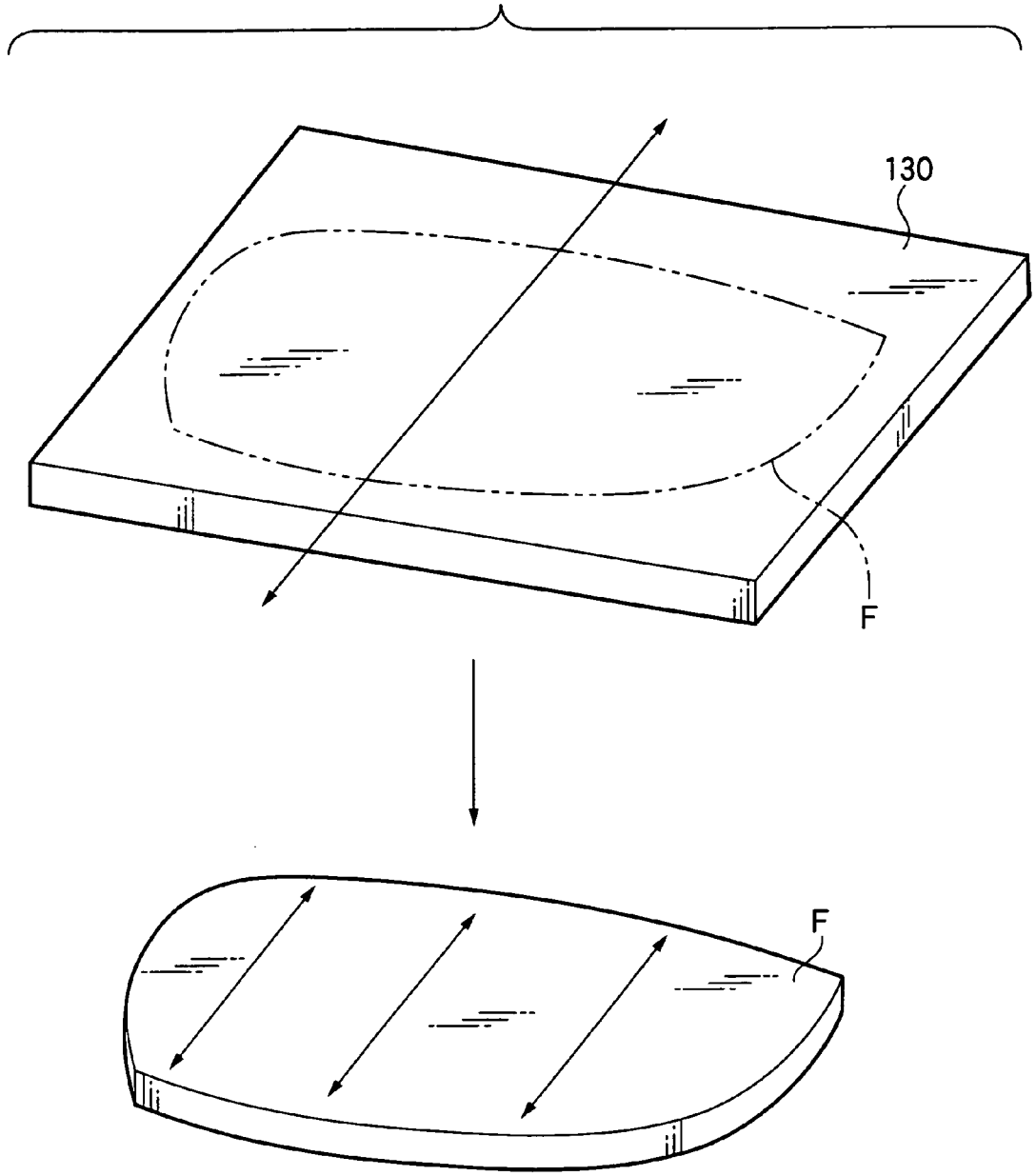
FIG. 11 is a diagram illustrating a method of manufacturing a golf club head in accordance with the invention, and is a diagram illustrating a first process for fabricating a face.

As shown in FIG. 11, the above-described face 110 is first formed by stamping out a rolled metal plate 130 of a β-based titanium alloy, as shown at the two-dotted dash line. In this case, the directions indicated by arrows show the rolling direction at the time when the rolled metal plate 130 is fabricated, and the metal plate 130 is rolled to a thickness of approximately 4.5 mm or less, preferably approximately 3.0 mm or less. Accordingly, as for a face material F thus stamped out, the longitudinal direction of the crystal grains is in an state of being oriented along the rolling direction, and this direction corresponds as it is to the top-sole direction.

It should be noted that the aforementioned rolling direction is a final rolling direction in a case where rolling is effected a plurality of times. In the case where the rolling direction is set in the top-sole direction, the rolling direction should preferably be at an angle of 0° with respect to a designated direction, but may be within a predetermined angular range (within±30°) in which the aforementioned operational advantages are demonstrated.

Figure 12:
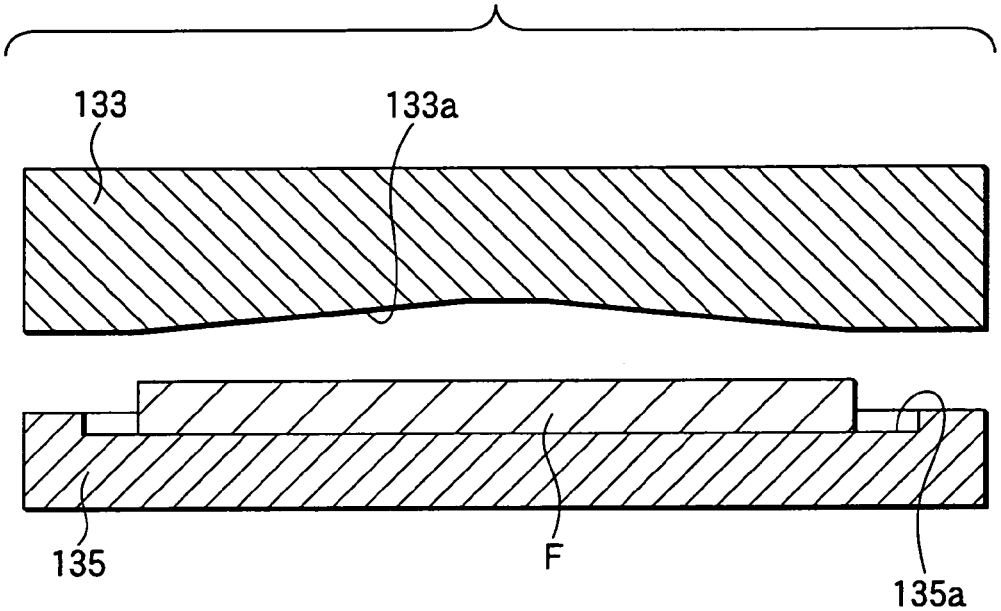
FIG. 12 is a cross-sectional view illustrating a second process (forging process) for fabricating the face.

Next, the stamped-out face material F is placed in a die assembly constituted by an upper die 133 and a lower die 135 as shown in FIG. 12. In this case, the upper die 133 has a face pressing portion 133a which is formed in a recessed manner such that its central portion becomes deepest, and the thick-walled portion is formed by that central portion. The lower die 135 has a recessed portion 135a which has dimensions slightly larger than those of the face material F for providing a space for plastic deformation and whose overall depth is substantially uniform. The face material F is placed in the recessed portion 135a to effect pressing in cooperation with the aforementioned upper die 133.

Figure 13:
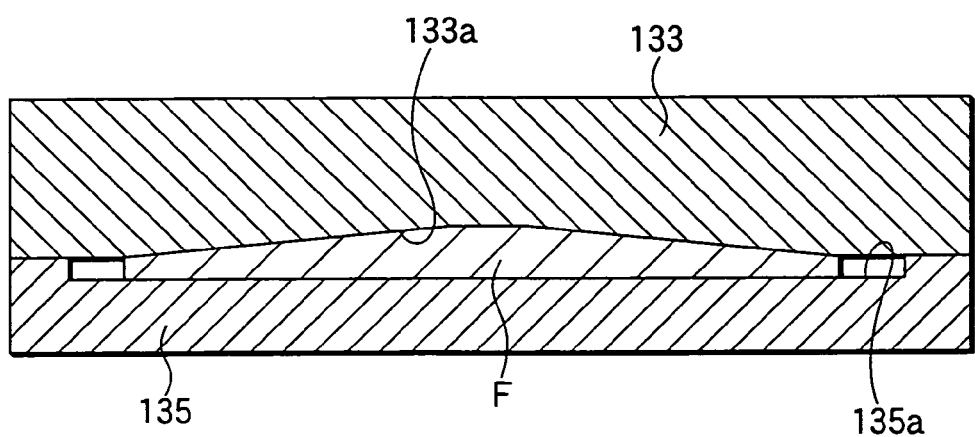
FIG. 13 is a cross-sectional view illustrating a process continuing from FIG. 12.

FIG. 13 shows a state in which the periphery of the face material is being thinned by causing the face material F to be plastically deformed by forging by pressing the upper die 133 against the lower die 135. At this time, although the upper die 133 presses the central portion of the face material, the amount of pressing at this portion is small so that the thick-walled portion is formed, while the amount of pressing at the periphery of the face is large, so that the thin-walled portion is formed. For this reason, the aforementioned direction of the crystal grains due to rolling is maintained at least on the central side of the face material F.

Figure 14:
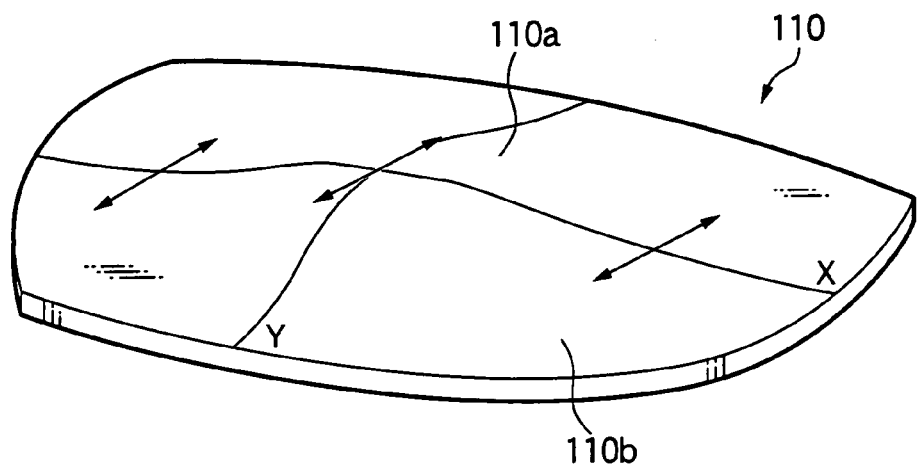
FIG. 14 is a perspective view of the face fabricated by the processes shown in FIGS. 11 to 13.

FIG. 14 is a perspective view, taken from the reverse surface side of the face 110 fabricated by the processes shown in FIGS. 11 to 13. In the drawing, a ridge line indicating the change of thickness in the toe-heel direction is shown by X, while a ridge line indicating the change of thickness in the top-sole direction is shown by Y so that the change in thickness can be readily seen. The arrows indicate the rolling direction (the elongated direction of the crystal grains).

According to the above-described manufacturing process, the face material which is initially subjected to rolling assumes a metallographic structure which is dense and has small variations. Since this face material is stamped out, and is subsequently forged by pressing it by the die assembly, large plastic deformations do not occur. Accordingly, it is possible to easily manufacture the face in which the thick-walled portion and the thin-walled portion are formed and which has sufficient strength (i.e., the golf club head to which such a face is secured).

According to the above-described manufacturing process, since the plastic deformation on the central portion which hits the ball frequently is small, the metallographic structure is maintained by the rolling in the top-sole direction. Therefore, it is possible to easily manufacture the face which is difficult to crack with respect to the flexure in the top-sole direction and excels in rebounding due to the thin periphery (i.e., the golf club head to which such a face is secured).

Incidentally, the forging process shown in FIG. 13 may be effected by hot forging or cold forging. In this case, cold forging is more preferable since it is possible to manufacture the face having high durable strength without causing much change in the characteristics of the material in forming the thin-walled portion (and the thick-walled portion).

Figure 15:
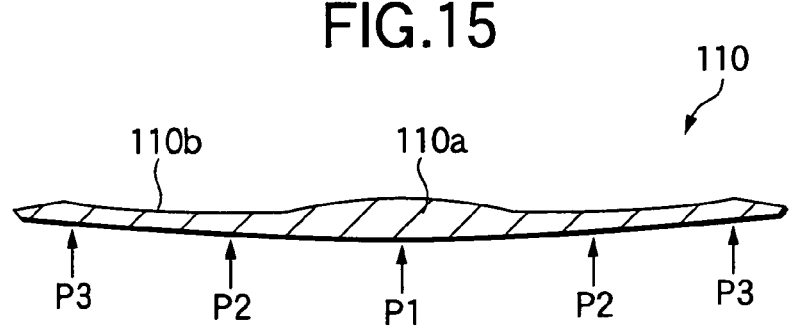
FIG. 15 is a cross-sectional view illustrating a state in which the face shown in FIG. 14 has been further processed.

In a case where the head is of the wood type, the aforementioned face is provided with a bulge and a roll. FIG. 15 is a cross-sectional view illustrating the face which is curved in the toe-heel direction and in the top-sole direction by further subjecting the face 110 formed as shown in FIG. 14 to a pressing process.

In the forging process, processing is effected such that the thickness at a central position P1 of the thick-walled portion 10a becomes approximately 2.3 mm, the thickness at a position P2 close to the center of the thin-walled portion 10b becomes approximately 2.1 mm, and the thickness at a position P3 close to the periphery of the thin-walled portion 110b becomes approximately 1.5 to 1.8 mm (with the wood-type head, there should preferably be a thickness difference of 0.3 to 0.8 mm or thereabouts between the thin-walled portion and the thick-walled portion). It should be noted that the die assembly may be so designed in advance as to allow the pressing process for providing the face with a bulge and a roll to be effected simultaneously at the time of the forging process shown in FIGS. 12 and 13. In addition, in this case, if a rolled material having the same thickness of 2.3 mm as that of the thick-walled portion 110a is used, the amount of plastic deformation of the thin-walled portion can be made small, and therefore production is facilitated.

Modification

Figure 16:
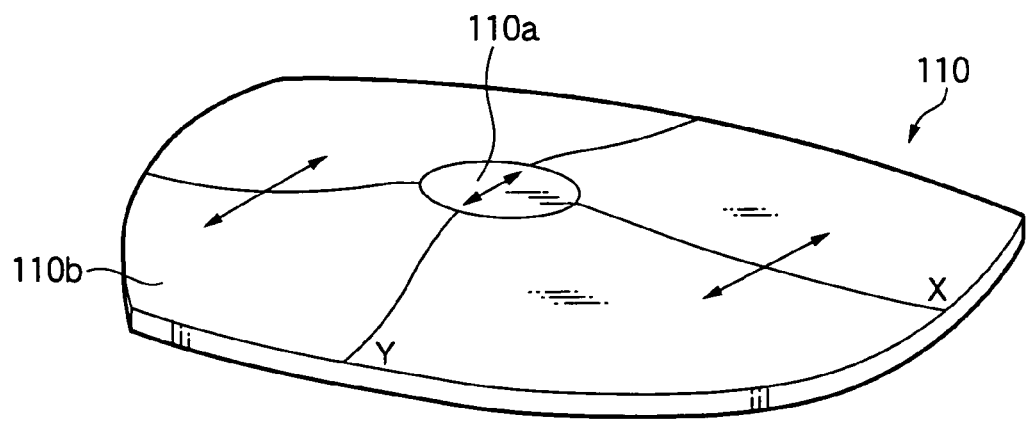
FIG. 16 is a diagram illustrating a modification of the face.

FIG. 16 is a diagram illustrating a modification of the face which is obtained by the above-described manufacturing process, and shows an example in which the thick-walled portion is formed in such a manner as not to press the central portion of the face at all in the above-described forging process. In this arrangement, since the thick-walled portion 110a is not pressed at all, the thick-walled portion 110a is formed in a flat shape, and the rolling direction of this portion (the elongated direction of the crystal grains) is in a state of being oriented in the top-sole direction without being affected by the forging process.

As shown in FIGS. 8 and 9, the face which is fabricated in the above-described manner is secured to the opening of the head body 105 by welding or the like. In this case, the peripheral edge portion of the face may be bent toward the backward side by a press or the like to cause a collar portion to project, and this collar portion may be secured to the head body by welding or the like.

As described above, although the embodiments of the invention have been described by citing the wood-type golf club head as an example, the invention is applicable to an iron-type head. It goes without saying that, in this case as well, the face in terms of its construction is provided in which the thick-walled portion and the thin-walled portion are formed by forging the metal plate subjected to rolling.

Sixth Embodiment

A description will be given of a golf club head of a wood type which is a metallic hollow head in accordance with a sixth embodiment of the invention.

Figure 17:
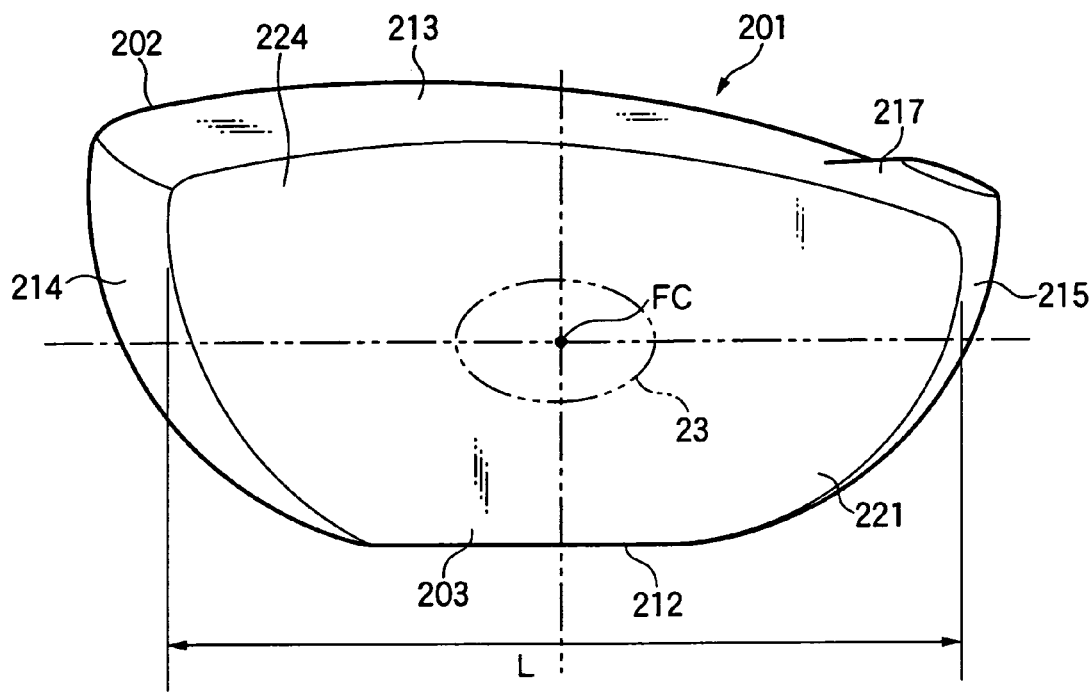
FIG. 17 is a front elevational view of a golf club head in accordance with an embodiment of the invention.
Figure 18:
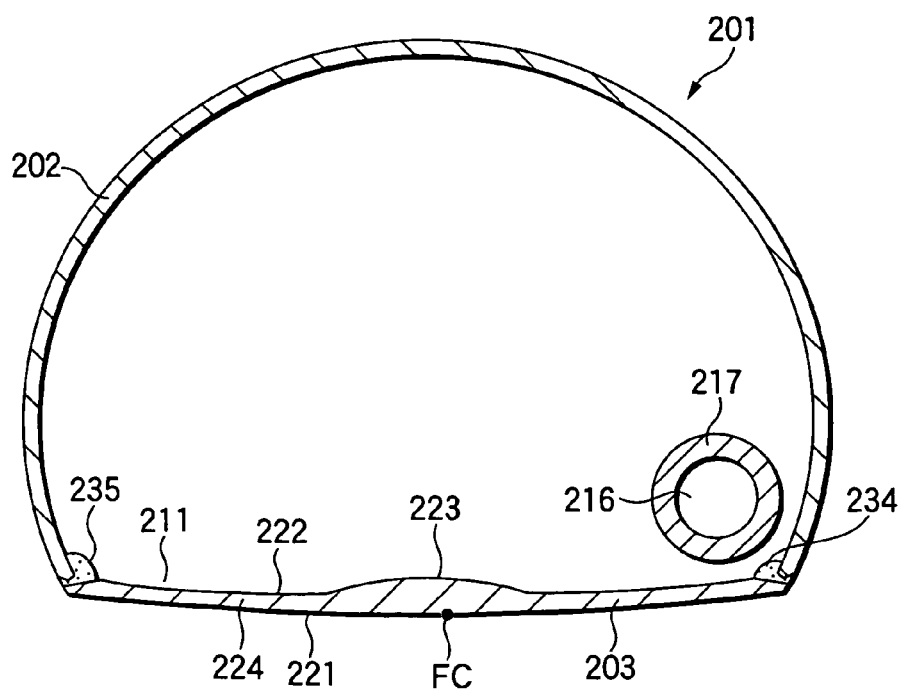
FIG. 18 is a cross-sectional view taken along a center of the golf club head in accordance with the embodiment of the invention.

As shown in FIG. 17, a golf club head 201 has a head body 202 formed by a hollow member, and a face member 203 for forming a face. As shown in FIG. 18, an opening 211 is formed in the head body 202 on the face side. The face member 203 is fixed at the opening 211 of the head body 202.

With the golf club head 201, a lower surface portion of the head body 202 is formed as a sole 212, an upper surface portion thereof is formed as a top 213, and left- and right-hand portions of the face member 203 are respectively formed as a toe 214 and a heel 215. A shaft securing portion 217 having a shaft securing hole 216 for attaching an unillustrated club shaft is formed on the heel 215 side.

The shape of the face member 203 which is fixed to the opening 211 of the aforementioned head body 202 is that of a contour conforming to the shape of the opening 211 of the head body 202, and the face member 203 is fixed to the head body 202 by causing the peripheral portion to abut against the peripheral edge of the opening 211 of the head body 202 and by welding them together.

Incidentally, the contour of the opening 211 of the head body 202 conforms to the contour of the face member 203. In the same way as a general golf club head, the length of this contour differs in the substantially perpendicular direction, and the length L in the toe-heel direction is longer than the length in the top-sole direction, as shown in FIG. 17.

The face member 203 is fabricated into a predetermined shape by, for example, stamping out a metal plate by a press and machining its reverse surface. An outer surface 221 of the face member 203 is a flat surface, while a reverse surface 222 of the face member 203 is formed into a projecting shape. It should be noted that the outer surface 221 may not be a flat surface and may be a surface which is curved in such a manner as to protrude gently, for instance.

As for the reverse surface 222 of the face member 203, a central area about a face center FC is formed to be high in the shape of a ridge, and the portion of this central area is formed as a thick-walled portion 223. Meanwhile, a peripheral area around the thick-walled portion 223 is formed to be low in the shape of the base of the ridge, and this area is formed as a thin-walled portion 224. Namely, the central area about the face center FC is formed as the thick-walled portion 223, and the peripheral portion around the thick-walled portion 223 is formed as the thin-walled portion 224.

A top portion 233 of the thick-walled portion 223 is formed flatly by leaving the surface of a metal plate, which is the material, as it is. The maximum thickness of the thick-walled portion 223 is preferably 3 mm or less, while the maximum thickness of the thin-walled portion 224 is smaller than that thickness of the thick-welled portion 23. Here, the face center FC refers to a point on the face which is intermediate between a top edge and a leading edge on the face center line in the top-sole direction passing through an intermediate position of the face width.

As the materials of the face member 203, it is possible to employ titanium, a titanium alloy, stainless steel, aluminum, soft iron, marageing steel, and the like. The metal plate which is the material of the face member 203 may be one in which crystal grains of its structure are close packed by subjecting it to rolling. In this case, in a case where the crystal grains are oriented to be elongated in one direction, it is preferable to fix the face member 203 to the head body 202 in a state in which the longitudinal direction of the crystal grains is oriented in the short-dimension direction of the face member 203, i.e., in the so-called top-sole direction.

Figure 20:
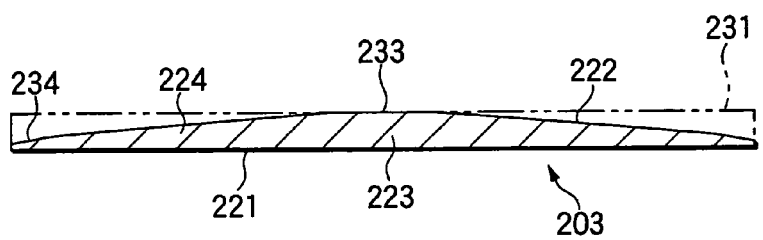
FIG. 20 is a longitudinal cross-sectional view of the face member of the golf club head in accordance with the embodiment of the invention.
Figure 21:
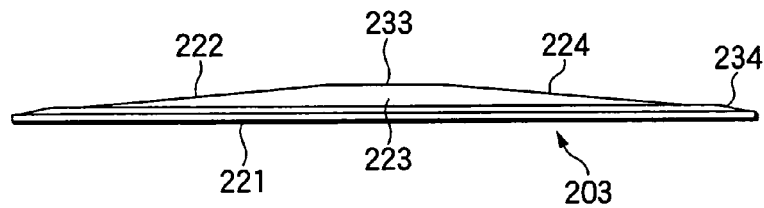
FIG. 21 is a side elevational view of the face member of the golf club head in accordance with the embodiment of the invention.

The reverse surface 22 of the face member 203 is shaved into a predetermined shape by machining, for instance. Namely, a metal plate 231 which is the material shown in FIG. 20 is cut out into a predetermined contour so that the face member 203 is cut out. As for the reverse surface 222 of the face member 203 thus cut out, the central area about the face center FC is left as the thick-walled portion 223, and the peripheral portion around the flat top portion 233 is shaved down to form the thin-walled portion 224. In the case where the peripheral area around the top portion 233 is shaved down, shaving is effected such that the closer to the periphery, the thinner. Accordingly, as shown in FIG. 18, the portion corresponding to the thin-walled portion 224 of the reverse surface 222 assumes a gentle shape continuing from the edge of the thick-walled portion 223 in the central area, and an extreme step is not produced between them.

In the case where the reverse surface 222 of the face member 203 is subjected to machining, the work can be finished efficiently if it is performed in two stages of rough cutting and finishing. If the work is finished by rubbing, the marks of a tool are difficult to remain. It is possible to easily cope even with the case in which the maximum height (Rmax) of the surface roughness is finished to 30 µm or less. Accordingly, if the work is performed in the stages of rough cutting, finishing, and rubbing, the cut marks are difficult to remain, and breakage from the marks can be prevented.

As described above, the thin-walled portion 224 which has been thinned is formed in the peripheral portion around the thick central portion by shaving down at least the peripheral portion of the reverse surface 222 of the face member 203 so that the central portion of the face member 203 becomes thick. As for the surface roughness of the reverse surface of the thin-walled portion 224 subjected to shaving, the maximum height (Rmax) of the surface roughness is preferably finished to 30 µm or less since surface irregularities which can cause breakage are small and in view of enhancing the strength. In particular, it is more preferable to set the maximum height (Rmax) of the surface roughness to 10 µm or less.

In a case where cutting is performed with a cutter, particularly in a case where finishing is performed, cutting is effected by conforming the moving direction of the cutter to the top-sole direction (direction conforming with the rolling direction) of the face member 203. Then, even if the marks of the cutter remain microscopically, the possibility of breakage from the marks is small as compared with the case of the cutter marks in the toe-heel direction which remain when cutting is effected by moving the cutter in the toe-heel direction.

It should be noted that the longitudinal direction of the crystal grains may be at an angle of being tilted back and forth or left and right within a fixed margin which can be considered to be a substantially vertical direction substantially perpendicular to the surface of the sole 212. For example, the longitudinal direction of the crystal grains may be an angular direction which is tilted back and forth or left and right within an angular range of 30°.

Figure 19:
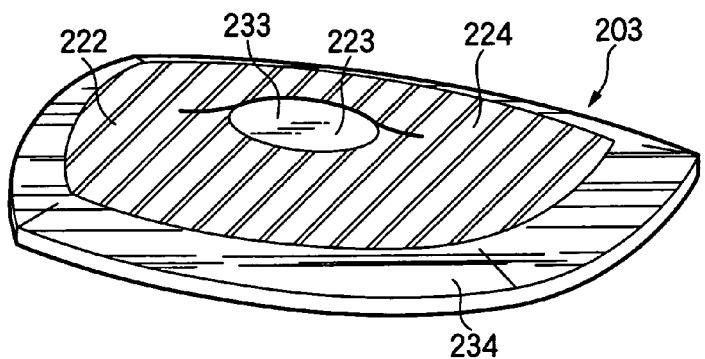
FIG. 19 is a perspective view illustrating a reverse surface of a face member of the golf club head in accordance with the embodiment of the invention.

As shown in FIG. 19, in the reverse surface 222 of the face member 203, a peripheral portion located outwardly of the thin-walled portion 224 is provided with trimming by diagonally shaving it down by using a milling machine or the like such that the peripheral side becomes thinner, thereby forming a tilted fringe portion 234.

Namely, in the reverse surface 222 of the face member 203, the peripheral edge portion which is abutted and welded to the peripheral edge of the opening 211 of the head body 202 is formed as the aforementioned fringe portion 234. If the maximum height (Rmax) of the surface roughness of this fringe portion 234 is also 30 µm or less, the spreading around of a welding material 235 when welding is subsequently performed is favorable, so that it is preferable. If the maximum height (Rmax) of the surface roughness of the fringe portion 234 is 10 µm or less, better results are obtained, so that it is more preferable.

Figure 22:
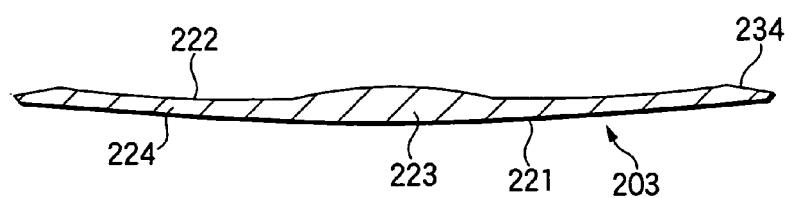
FIG. 22 is a longitudinal cross-sectional view at the time when the face member of the golf club head in accordance with the embodiment of the invention is subjected to pressing.

Next, as shown in FIG. 22, the face of the face member 203 which has been finished by subjecting it to shaving is curved by a press or the like. In other words, the face of the face member 203 is curved in both the toe-heel direction and the top-sole direction so as to be formed into the shape of a bulge roll.

When this face member 203 is attached to the peripheral edge of the opening 211 of the head body 202, the fringe portion 234 is made to abut against the peripheral edge of the opening 211 of the head body 202, and the two members are welded together.

As described above, in this embodiment, since the peripheral portion on the reverse surface of the face is shaved down and is hence formed with a small wall thickness so that the central portion of the face member 203 becomes thick, the central portion of the face has sufficient strength for striking a ball, and the peripheral portion rebounds sufficiently, thereby making it possible to improve the carry of the ball. Since the reverse surface of the face is formed by shaving, for example, variations of its thickness become small as compared with the face member fabricated by forging. Incidentally, although waviness remains on the face of the face member fabricated by forging, the waviness is shaved off by shaving, and the finishing accuracy improves, so that the strength is enhanced in the thinned portion as well.

Moreover, since even the peripheral edge portion of the face is subjected to shaving, and this fringe portion 234 is welded to the head body 202, the face member 203 can be accurately and stably supported by the head body 202 and can be welded thereto uniformly, and the accuracy with which the face member is attached can be improved. The entry of the welding material along the surface of the fringe portion 234 is facilitated, so that firm welding is effected. Since the fringe portion 234 is a diagonally shaved surface, the entry of the welding material is facilitated, so that the welding strength is further enhanced.

Since the maximum height (Rmax) of the surface roughness of the fringe portion 234 in the reverse surface 222 of the face member 203 can be made small, surface irregularities which can cause fractures are eliminated, and even with the thinned portion breakage from this portion can be prevented.

The spreading around of the welding material 235 is made favorable by the provision of the aforementioned fringe portion 234. Since the maximum height (Rmax) of the surface roughness of the fringe portion 234 is 30 □m or less, the surface irregularities are reduced, and impurities are made difficult to be present at the weld, so that it is possible to prevent oxidized brittle welds from being formed, thereby enhancing the welding strength. Accordingly, the face member 203 can be firmly welded to the head body 202, and the head body 202 and the face member 203 can be firmly fixed together.

In addition, even if the material of the face member 203 is a titanium alloy, particularly a β alloy which is difficult to work, processing can be effected with high accuracy, thereby making it obtain a satisfactory face.

It should be noted that, as the processing method for forming the thin-walled portion in the plate-like metallic member subjected to rolling, it is possible to adopt not only cutting but also grinding, rubbing, and the like insofar as they are capable of removing the thickness without changing the state of the crystal grains of the structure of the face member 203, and machining can be applied extensively. After the metal plate 231 is formed into a predetermined thickness by subjecting it to machining, the face member 203 may be cut out.

With the golf club head in this embodiment, in the case where the metal plate subjected to rolling is used for the face member 203, it is possible to obtain the face member 203 which, as compared with a forged face member, has no variations in strength, is difficult to break, and is stable in quality. Even if the thickness of the face member 203 is varied, it is possible to reliably obtain a product in which the face member 203 subjected to rolling has planned rigidity and strength. Since the thick-walled portion 223 is formed at the central portion of the face, the central portion of the face has sufficient strength against a shock at the time of impacting the ball, and the stability of striking the ball is high. Since the peripheral portion of the face member 203 is formed as the thin-walled portion, the thin-walled portion sufficiently rebounds at the time of impacting the ball, so that it is possible to improve the carry of the ball, and the peripheral portion of the face member 203 is difficult to break.

Since the face member 203 is provided with processing in which it is rolled in the vertical direction, the longitudinal direction of the crystal grains of the material is oriented in the short-dimension direction of the face member 203, so that the breaking elongation (strength) in the vertical direction of the face member 203 becomes large, and it is possible to prevent fractures along the horizontal direction which are liable to occur in the face member 203.

As the face member 203, it is possible to use a material subjected to rolling in the vertical direction and the horizontal direction. In this case, if the longitudinal direction is absent in the crystal grains of the material, the face member 203 can be secured to the head body 202 irrespective of the rolling direction.

Since the thin-walled portion 224 of the face member 203 is formed by machining, unlike the case where it is formed into a predetermined configuration by forging, it is possible to obtain planned quality, so that the quality becomes stable, and face characteristics of planned strength cat be obtained in the thin-walled portion 224 of the face member 203 as well.

In the invention, the face member 203 may be obtained by machining a forged metal member. Since the forged member is subjected to machining, strains in the completed face member 203 are small. In a case where a plate member with a uniform thickness is forged and is subjected to machining, the strains in the completed face member 203 are particularly small, so that the quality of the face member 203 improves.

It should be noted that the invention is not limited to the above-described embodiments. In addition, the invention is also applicable to cases where items based on the various embodiments described above may be used in combination. The peripheral area which is subjected to machining may not necessarily be located over the entire periphery surrounding the central area, but suffices if it is located in a periphery close to the central area.

As described above, in accordance with the invention, since the face member is formed by using a plate-like metal member subjected to rolling, and the face portion has a thick-walled central portion and a thin-walled peripheral portion, it is possible to provide a golf club head which makes it possible to make the face member thin, ensure strength with respect to a shock at the time of impacting, enhance the repellency at the time of impacting, increase the carry of the ball, and make clear the striking feel at the time of impacting.

Further, in accordance with the invention, it is possible to obtain a golf club head having a metal face with its thickness varied and with sufficient strength, as well as a method of manufacturing such a golf club head.

Further, in accordance with the invention, it is possible to provide a golf club head which facilitates the adjustment and processing of the thickness of the face member, facilitates the fabrication of the respective portions to planned dimensions and strengths, and makes it possible to enhance the strength for attaching the face member to a head body.

What is claimed is:

1. A golf club head comprising:
    a face portion formed by using a rolled metal plate member, the face portion having a thick-walled portion and a thin-walled portion,
    wherein a reverse surface of said face portion comprises a flat surface at said thick-walled portion, said thin-walled portion being formed around said flat surface,
    wherein said flat surface comprises a substantially uniform elevation and has an outermost periphery located at a central area of said face portion,
    wherein said face portion further comprises a sloped portion which is formed around said flat surface and comprises a slope in a direction perpendicular to a rolling direction which is gentler than a slope of said sloped portion in the rolling direction.

2. The golf club head according to claim 1, wherein said sloped portion comprises a gently-sloped portion, the thick-walled portion being smoothly connected to the thin-walled portion by said gently-sloped portion.

3. The golf club head according to claim 1, wherein said sloped portion separates the thick-walled portion and the thin-walled portion.

4. The golf club head according to claim 1, wherein the thick-walled portion and the thin-walled portion are formed by a change of said reverse surface of the face portion, and thickness of the thick-walled portion is at least 10% greater than a thickness of the thin-walled portion.

5. The golf club head according to claim 1, wherein the face portion is formed by using the rolled metal plate member having a central portion which is thick-walled and a peripheral portion which is thin-walled.

6. The golf club head according to claim 5, wherein the thin-walled portion is formed such that a thickness of said thin-walled portion decreases in a direction toward a peripheral side of the metal plate member.

7. The golf club head according to claim 5, wherein the face portion is subjected to rolling in a top-sole direction, and the central portion thereof is formed to be thick-walled.

8. The golf club head according to claim 5, wherein the thin-walled portion has a direction of its crystal grains oriented in a direction toward a periphery of the face portion.

9. The golf club head according to claim 1, wherein a rolling direction of the metal plate member for making up the face portion is set to a short-dimension direction of the face portion.

10. The golf club head according to claim 5, wherein at least a portion of said reverse surface of said face portion is machined to form said thin-walled portion, and wherein a machining direction is the same as a rolling direction of the metal plate member.

11. The golf club head according to claim 1, wherein the thin-walled portion has a direction of its crystal grains oriented in a same direction as that of the thick-walled portion.

12. The golf club head according to claim 1, wherein the face portion is formed by forging the rolled metal plate, such that said thick walled portion is not pressed during said forging.

13. The golf club head according to claim 1, wherein said thick-walled portion comprises a maximum thickness of 3 mm, and said thin-walled portion comprises a maximum thickness of 2.5 mm.

14. The golf club head according to claim 1, wherein said thick-walled portion comprises a maximum thickness of 2.7 mm, and said thin-walled portion comprises a maximum thickness of 2 mm.

15. The golf club head according to claim 1, wherein said metal plate member comprises crystal grains which are longitudinally oriented in a short-dimension direction of the face portion.

16. The golf club head according to claim 1, wherein said metal plate member comprises at least one of titanium, a titanium alloy, stainless steel, aluminum, and soft iron.

17. The golf club head according to claim 1, further comprising:
    a head body having an opening, said thin-walled portion comprising a tilted fringe portion for abutting against said opening.

18. The golf club head according to claim 17, wherein said tilted fringe portion comprises a thickness which is less than a thickness of a remainder of said thin-walled portion.

19. The golf club head according to claim 1, wherein said flat surface includes a longitudinal direction which is formed perpendicular to a rolling direction of said face portion, and has a center which substantially corresponds to a center of said face portion.

20. The golf club head according to claim 1, wherein said flat surface comprises an elliptical-shaped surface having a longitudinal direction which is formed perpendicular to a rolling direction of said face portion.

21. The golf club head according to claim 1, wherein said sloped portion is formed around an entirety of said outermost periphery of said flat surface.

22. The golf club head according to claim 1, wherein said sloped portion comprises an outermost periphery which is bounded by said thin-walled portion.

23. The golf club head according to claim 22, wherein said thin-walled portion is formed around an entirety of said outermost periphery of said sloped portion.

24. A golf club head comprising:
    a face portion formed by using a rolled metal plate member, the face portion having a thick-walled portion and a thin-walled portion,
    wherein the thick-walled portion and the thin-walled portion are formed in the face portion by forging the rolled metal plate,
    wherein a thickness of said thick-walled portion is substantially the same as a thickness of a plate from which said face portion is forged,
    wherein said thick-walled portion comprises a surface having a substantially uniform elevation and an outermost periphery located at a central area of said face portion, and
    wherein said face portion further comprises a sloped portion which is formed around said thick-walled portion and comprises a slope in a direction perpendicular to a rolling direction which is gentler than a slope of said sloped portion in the rolling direction.

25. The golf club head according to claim 24, wherein said metal plate member comprises at least one of titanium, a titanium alloy, stainless steel, aluminum, and soft iron.

26. A golf club head comprising:
a head body; and
a face member,
wherein at least a peripheral portion of a reverse surface of the face member, which is located around a central portion of the reverse surface of the face member, is shaved down so that the central portion of the face member becomes thick, and a peripheral edge portion of the face member in which the peripheral portion around the central portion has been thinned is welded to said head body,
wherein said reverse surface comprises a flat surface at said central portion said peripheral edge portion being formed around said flat surface,
wherein said flat surface comprises a substantially uniform elevation and has an outermost periphery located at a central area of said face portion, and
wherein said reverse surface further comprises a sloped portion which is formed around said flat surface and comprises a slope in a direction perpendicular to a rolling direction which is gentler than a slope of said sloped portion in the rolling direction.

27. The golf club head according to claim 26, wherein a maximum height of the surface roughness of the peripheral portion of the reverse surface of the face member is 30 μm or less.

28. The golf club head according to claim 26, wherein a fringe surface for welding is formed at the peripheral edge portion of the reverse surface of the face portion by machining.

29. The golf club head according to claim 28, wherein a maximum height of the surface roughness of the fringe surface for welding is 30 μm or less.

30. A face member for a golf club head, comprising:
a rolled metal plate comprising:
a first portion; and
a second portion having a thickness which is less than a thickness of said first portion, said second portion being formed by machining at least a portion of a reverse surface of said rolled metal plate, wherein said reverse surface comprises a flat surface at said first portion, said second portion being formed around said flat surface, wherein said flat surface comprises a substantially uniform elevation and has an outermost periphery located at a central area of said face portion, and wherein said reverse surface further comprises a sloped portion which is formed around said flat surface and comprises a slope in a direction perpendicular to a rolling direction which is gentler than a slope of said sloped portion in the rolling direction.

* * * * *